United States Patent
Ding et al.

(10) Patent No.: US 11,366,282 B2
(45) Date of Patent: Jun. 21, 2022

(54) LENS MODULE AND ELECTRONIC DEVICE HAVING THE SAME INCLUDING HEAT DISSIPATION PLATES

(71) Applicant: TRIPLE WIN TECHNOLOGY(SHENZHEN) CO. LTD., Shenzhen (CN)

(72) Inventors: Sheng-Jie Ding, Guangdong (CN); Shin-Wen Chen, New Taipei (TW); Jing-Wei Li, Guangdong (CN); Jian-Chao Song, Guangdong (CN); Ke-Hua Fan, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 256 days.

(21) Appl. No.: 16/903,155

(22) Filed: Jun. 16, 2020

(65) Prior Publication Data
US 2021/0325627 A1   Oct. 21, 2021

(30) Foreign Application Priority Data

Apr. 21, 2020 (CN) .......................... 202010316386.2

(51) Int. Cl.
*G02B 7/02* (2021.01)

(52) U.S. Cl.
CPC .................................. *G02B 7/028* (2013.01)

(58) Field of Classification Search
CPC ........ G02B 7/028; G03B 21/16; H01L 31/024
USPC ........................................................ 359/820
See application file for complete search history.

(56) References Cited

U.S. PATENT DOCUMENTS

| | | | | |
|---|---|---|---|---|
| 5,270,869 A | * | 12/1993 | O'Brien | G02B 27/09 385/33 |
| 5,270,870 A | * | 12/1993 | O'Brien | H01S 5/023 385/33 |
| 5,313,333 A | * | 5/1994 | O'Brien | G02B 7/028 359/811 |
| 6,977,783 B2 | * | 12/2005 | Lung | G02B 7/02 348/340 |

(Continued)

FOREIGN PATENT DOCUMENTS

| | | | | |
|---|---|---|---|---|
| JP | 59015206 A | * | 1/1984 | ............. G02B 7/028 |
| JP | 2008219704 A | * | 9/2008 | ............... G02B 7/02 |

(Continued)

*Primary Examiner* — Zachary W Wilkes
(74) *Attorney, Agent, or Firm* — ScienBiziP, P.C.

(57) ABSTRACT

A lens module includes a lens holder, a filter, and a metal support. The lens holder includes a groove and sidewalls surrounding to form the groove. The metal support includes a support plate, heat dissipation plates, and heat transfer plates. At least one first mounting hole is formed on the sidewalls. The support plate comprises a support portion and a connecting portion connecting to each other. The connecting portion connects the support portion and each of the heat transfer plates. An opening is formed on the support portion and passes through the support portion. The filter is located on the support portion and covers the opening. The heat transfer plates are installed in the at least one first mounting hole. The support plate is received in the groove. The heat dissipation plates are located outside the lens holder. The disclosure also provides an electronic device having the lens module.

18 Claims, 5 Drawing Sheets

(56) References Cited

U.S. PATENT DOCUMENTS

| | | | | |
|---|---|---|---|---|
| 7,365,923 | B2* | 4/2008 | Hargis | G02B 7/008 |
| | | | | 385/94 |
| 7,961,220 | B2* | 6/2011 | Orihashi | H04N 5/2253 |
| | | | | 348/208.7 |
| 8,184,432 | B2* | 5/2012 | Miyashita | G06F 1/20 |
| | | | | 361/728 |
| 8,491,126 | B2* | 7/2013 | Ko | G03B 21/16 |
| | | | | 353/100 |
| 8,605,226 | B2* | 12/2013 | Cho | H04N 9/3144 |
| | | | | 62/3.2 |
| 9,250,504 | B2* | 2/2016 | Nishimori | F21V 29/60 |
| 9,838,558 | B2* | 12/2017 | Petty | G06F 1/20 |
| 10,074,757 | B2* | 9/2018 | Hokari | H01L 31/03926 |
| 10,268,018 | B1* | 4/2019 | Ding | G03B 3/10 |
| 10,645,795 | B2* | 5/2020 | Byrne | G02B 7/028 |
| 10,809,486 | B2* | 10/2020 | Hosoe | H04N 5/22521 |
| 10,951,798 | B2* | 3/2021 | Ma | H04N 5/22521 |
| 11,003,056 | B2* | 5/2021 | Li | G02B 1/14 |
| 11,125,968 | B2* | 9/2021 | Yang | G02B 7/181 |
| 2004/0179278 | A1* | 9/2004 | Bonaventura | G02B 21/06 |
| | | | | 359/820 |
| 2006/0256199 | A1* | 11/2006 | Takahashi | G02B 7/028 |
| | | | | 348/E5.026 |
| 2008/0062698 | A1* | 3/2008 | Tai | H01L 33/486 |
| | | | | 362/294 |
| 2019/0124238 | A1* | 4/2019 | Byrne | H05K 7/20854 |
| 2019/0124243 | A1* | 4/2019 | Mleczko | H05K 7/205 |

FOREIGN PATENT DOCUMENTS

| | | | | |
|---|---|---|---|---|
| KR | 20100102827 A | * | 9/2010 | H01L 23/367 |
| WO | WO-2017088091 A | * | 6/2017 | G03B 17/55 |

* cited by examiner

LENS MODULE AND ELECTRONIC DEVICE HAVING THE SAME INCLUDING HEAT DISSIPATION PLATES

FIELD

The subject matter herein generally relates to a lens module and an electronic device having the lens module.

BACKGROUND

With the development of electronic products, the lens module is an important component in electronic products, and consumers have increasingly higher requirements for the heat dissipation of the electronic products.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
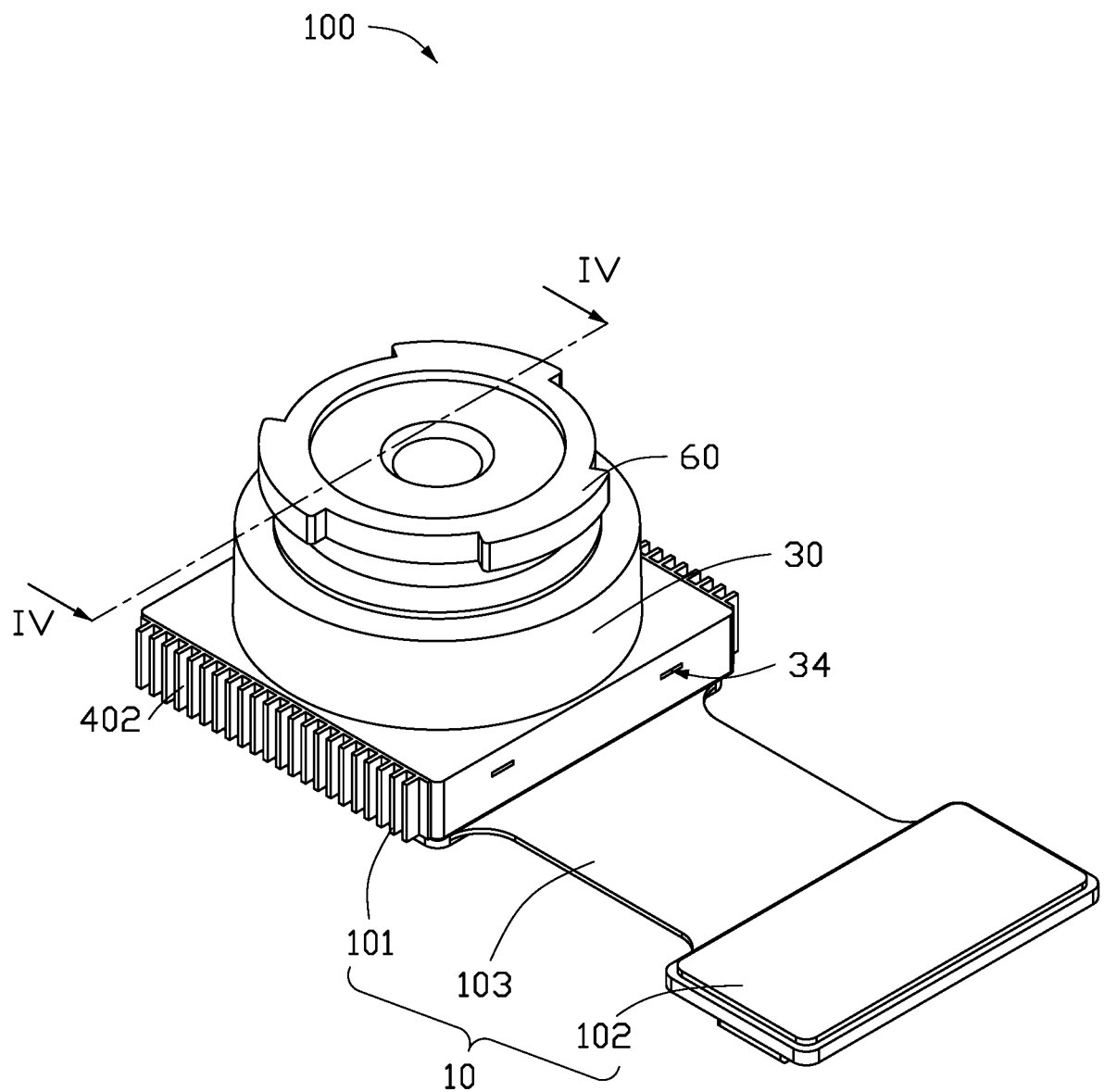
FIG. 1 is a diagram of an embodiment of a lens module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
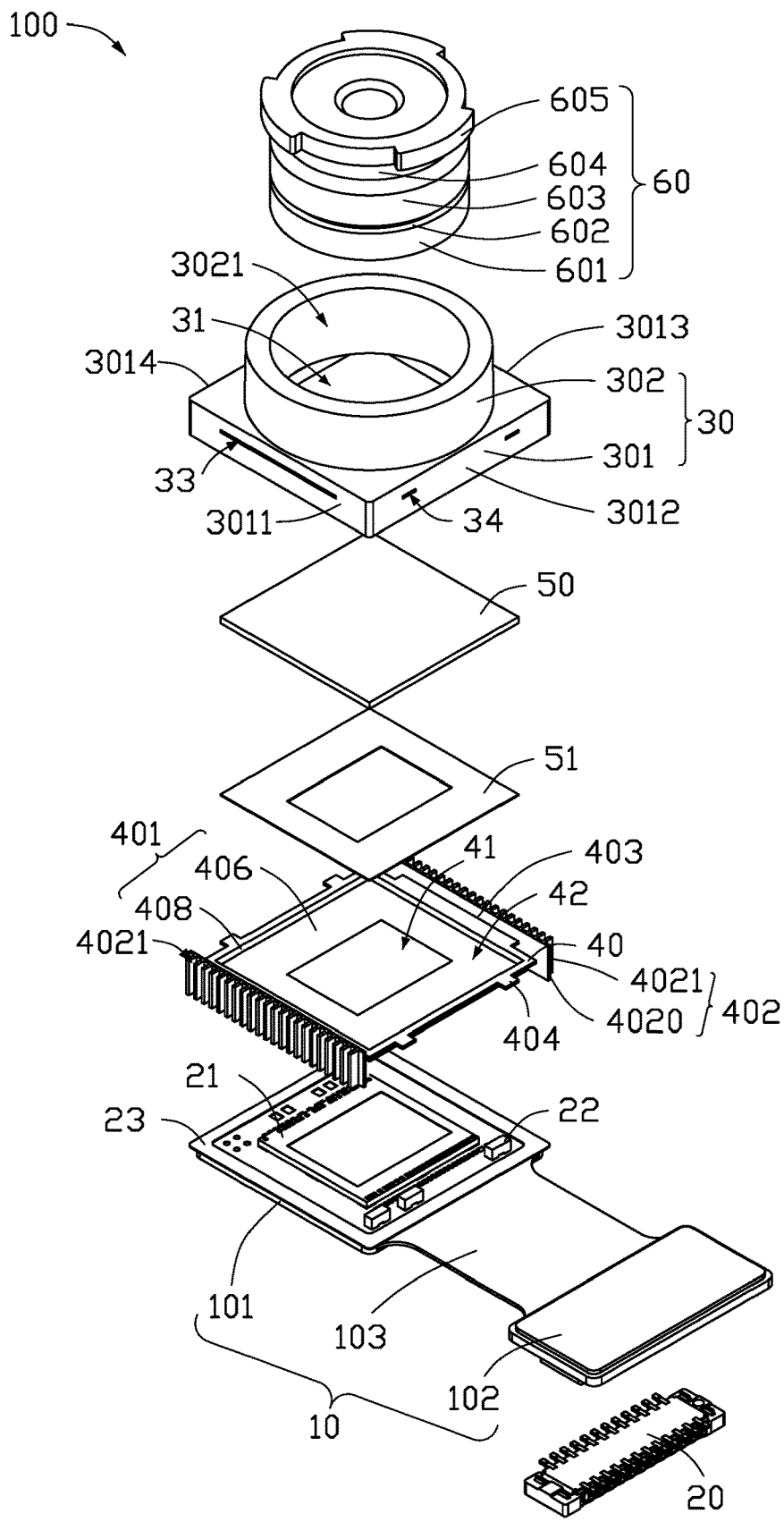
FIG. 2 is an exploded, diagrammatic view of the lens module of FIG. 1.
Figure 3:
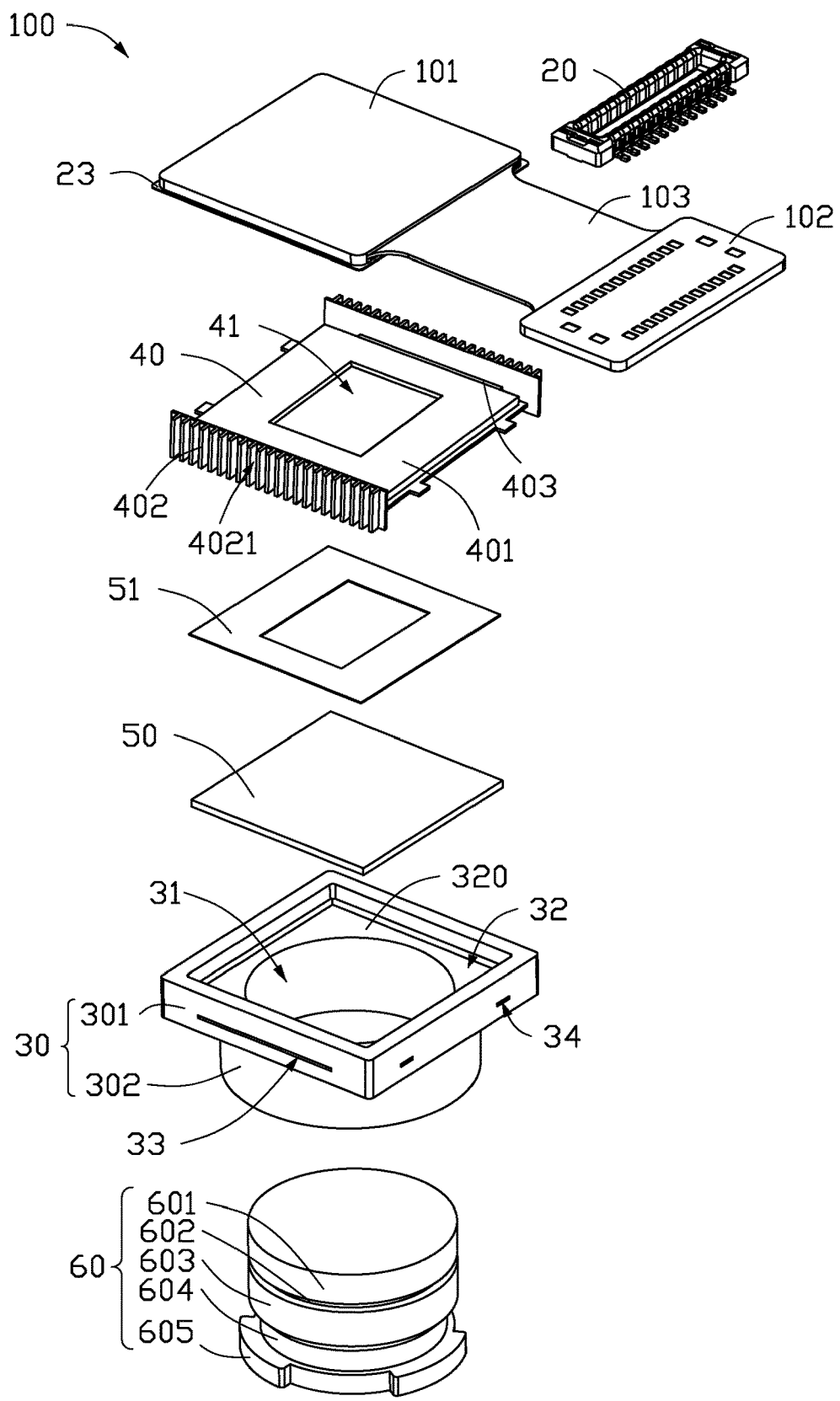
FIG. 3 is an exploded, diagrammatic view of the lens module of FIG. 1 viewed from another angle.

FIG. 1 illustrates an embodiment of a lens module 100. Referring to FIGS. 2 and 3, the lens module 100 includes a circuit board 10, a lens holder 30, a metal support 40, a filter 50, and a lens 60.

In at least one embodiment, the circuit board 10 may be a flexible circuit board, a rigid circuit board, or a rigid-flexible circuit board. In an embodiment, the circuit board 10 is a rigid-flexible circuit board including a first rigid portion 101, a second rigid portion 102, and a flexible portion 103 connecting the first rigid portion 101 and the second rigid portion 102. At least one electronic connecting element 20 is mounted on a surface of the second rigid portion 102. When the lens module 100 is applied to an electronic device 200 (shown in FIG. 5), the electronic connecting element 20 is configured to transmit signals between the lens module 100 and other components of the electronic device 200. In at least one embodiment, the electronic connecting element 20 may be a connector or a gold finger.

A photosensitive chip 21 and a plurality of electronic components 22 are mounted on a same surface of the first rigid portion 101. In at least one embodiment, the photosensitive chip 21 and the plurality of electronic components 22 may be mounted on different surfaces of the first rigid portion 101. The plurality of electronic components 22 may be at least one of resistors, capacitors, diodes, triodes, relays and electrically erasable programmable read-only memory (EEPROM), or the like.

Figure 4:
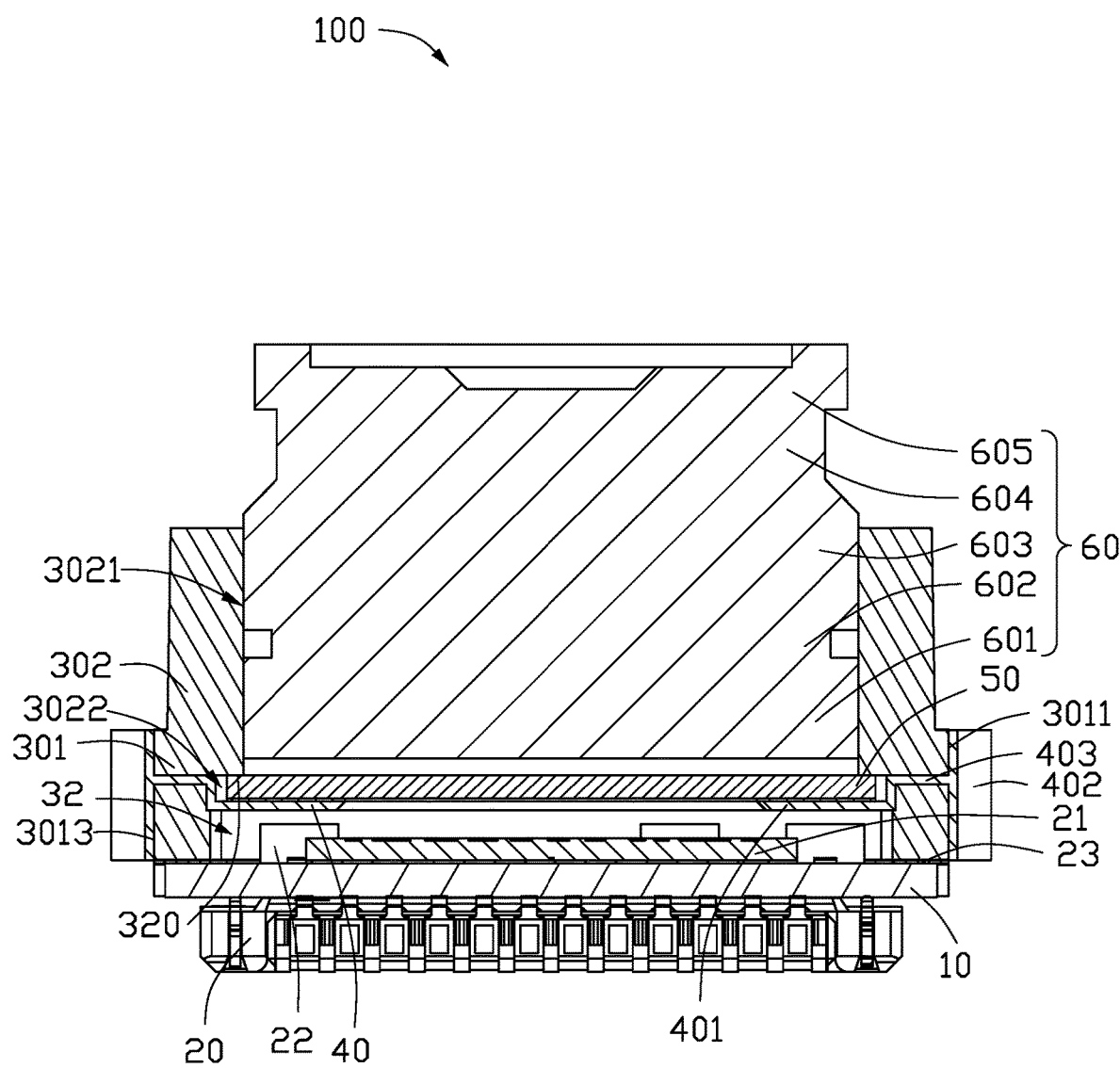
FIG. 4 is a cross-sectional view of the lens module taken along line IV-IV of FIG. 1.

The lens holder 30 is mounted on the surface of the first rigid portion 101 by a first adhesive layer 23 where the photosensitive chip 21 and the plurality of electronic components 22 are mounted. Referring to FIG. 4, the photosensitive chip 21 and the plurality of electronic components 22 are received in the lens holder 30.

Referring to FIG. 4, in at least one embodiment, the lens holder 30 includes a first holder portion 301 and a second holder portion 302. In at least one embodiment, the first holder portion 301 may have a substantially rectangular parallelepiped shape, the second holder portion 302 may have a substantially cylindrical shape. The first holder portion 301 is fixed on the circuit board 10. The second holder portion 302 connects a side of the first holder portion 301 facing away from the circuit board 10. A width of the second holder portion 302 is greater than a width of the second holder portion 302. A receiving hole 31 is formed on the lens holder 30 and passes through the first holder portion 301 and the second holder portion 302. A portion of a surface of the first holder portion 301 facing away from the second holder portion 302 surrounding the receiving hole 31 is recessed toward the second holder portion 302 to form a groove 32. The groove 32 communicates with the receiving hole 31. A width of the groove 32 is greater than a width of the receiving hole 31, thereby forming a stepped surface 320 between the groove 32 and the receiving hole 31. The photosensitive chip 21 and the plurality of electronic components 22 are received in the groove 32.

In at least one embodiment, referring to FIG. 2, the first holder portion 301 includes sidewalls surrounding to form the groove 32. The sidewalls include a first sidewall 3011, a second sidewall 3012, a third sidewall 3013 and a fourth sidewall 3014 sequentially connected head-to-tail. The first sidewall 3011 is opposite to the third sidewall 3013, the second sidewall 3012 is opposite to the fourth sidewall 3014. Referring to FIGS. 2, 3, and 4, a first mounting hole 33 is formed on each of the first sidewall 3011 and the third sidewall 3013, and each first mounting hole 33 passes through the first sidewall 3011 or the third sidewall 3013 to communicate with the groove 32. At least one second mounting hole 34 is formed on each of the second sidewall 3012 and the fourth sidewall 3014, and each of the at least one second mounting hole 34 passes through the second sidewall 3012 or the fourth sidewall 3014 to communicate with the groove 32. In the illustrated embodiment, two second mounting holes 34 are formed on each of the second sidewall 3012 and the fourth sidewall 3014.

In at least one embodiment, the metal support 40 may be darkened by an oxidation treatment.

The metal support 40 includes a support plate 401, heat dissipation plates 402, and heat transfer plates 403 connecting between the support plate 401 and the heat dissipation plates 402. In at least one embodiment, the metal support 40 may be made of copper or aluminum.

Referring to FIGS. 2 and 4, the support plate 401 includes a support portion 406 and a connecting portion 408 connected to each other. The connecting portion 408 may be perpendicular to the support portion 406. The connecting portion 408 surrounds the support portion 406 to cooperate to form a receiving space 42. The connecting portion 408 connects the support portion 406 and each of the heat transfer plates 403. An opening 41 is formed on the support portion 406 and passes through the support portion 406. The filter 50 is received in the receiving space 42 and bonded on the support portion 406 by a second adhesive layer 51 to cover the opening 41. Each of the heat transfer plates 403 is installed in the first mounting hole 33, the support plate 401 and the filter 50 are received in the groove 32, and the heat dissipation plates 402 are located outside the lens holder 30. So that the heat generated by the lens module 100 is sequentially transmitted to the heat dissipation plates 402 through the support plate 401 and the heat transfer plates 403, and radiated to the external environment by the heat dissipation plates 402.

The filter 50 corresponds to the photosensitive chip 21. The filter 50 is sandwiched between the support portion 406 and the stepped surface 320.

In at least one embodiment, the number of the heat dissipation plates 402 is two, and the number of the heat transfer plates 403 is two. The two heat dissipation plates 402 are located on two opposite sides of the support plate 401. In at least one embodiment, the two heat transfer plates 403 are respectively installed in two first mounting holes 33, so that the two heat dissipation plates 402 are respectively located on a side of the first sidewall 3011 facing away from the third sidewall 3013 and a side of the third sidewall 3013 facing away from the first sidewall 3011. Each of the heat dissipation plates 402 includes a base 4020 and a plurality of heat dissipation fins 4021 on a surface of the base 4020. A surface of the base 4020 facing away from the plurality of heat dissipation fins 4021 connects the heat transfer plate 403. In at least one embodiment, the base 4020 is perpendicular to the heat transfer plate 403. The plurality of heat dissipation fins 4021 increases a surface area of the heat dissipation plate 402, thereby increasing a heat dissipation capability of the heat dissipation plate 402.

The metal support 40 may further include at least one positioning member 404. Each positioning member 404 extends from the connecting portion 408 in a direction away from a central axis of the opening 41. Each positioning member 404 is received in one of the at least one second mounting hole 34. In at least one embodiment, the metal support 40 includes four positioning members 404, two of the four positioning members 404 are installed in the second mounting holes 34 on the second sidewall 3012, and the others are installed in the second mounting holes 34 on the fourth sidewall 3014.

The first holder portion 301 and the second holder portion 302 may be formed separately or integrally formed. In at least one embodiment, the first holder portion 301 and the second holder portion 302 are integrally formed. The first holder portion 301 and the second holder portion 302 may be made of plastic, such as polyethylene.

The lens 60 is partially received in the receiving hole 31. The lens 60 may include a first lens portion 601, a second lens portion 602, a third lens portion 603, a fourth lens portion 604, and a fifth lens portion 605 stacked orderly. In at least one embodiment, a width of the third lens portion 603 is greater than a width of the second lens portion 602 and is greater than a width of the fourth lens portion 604. In at least one embodiment, a width of the fifth lens portion 605 is greater than the width of the fourth lens portion 604. In at least one embodiment, a width of the first lens portion 601 is greater than the width of the second lens portion 602.

Figure 5:
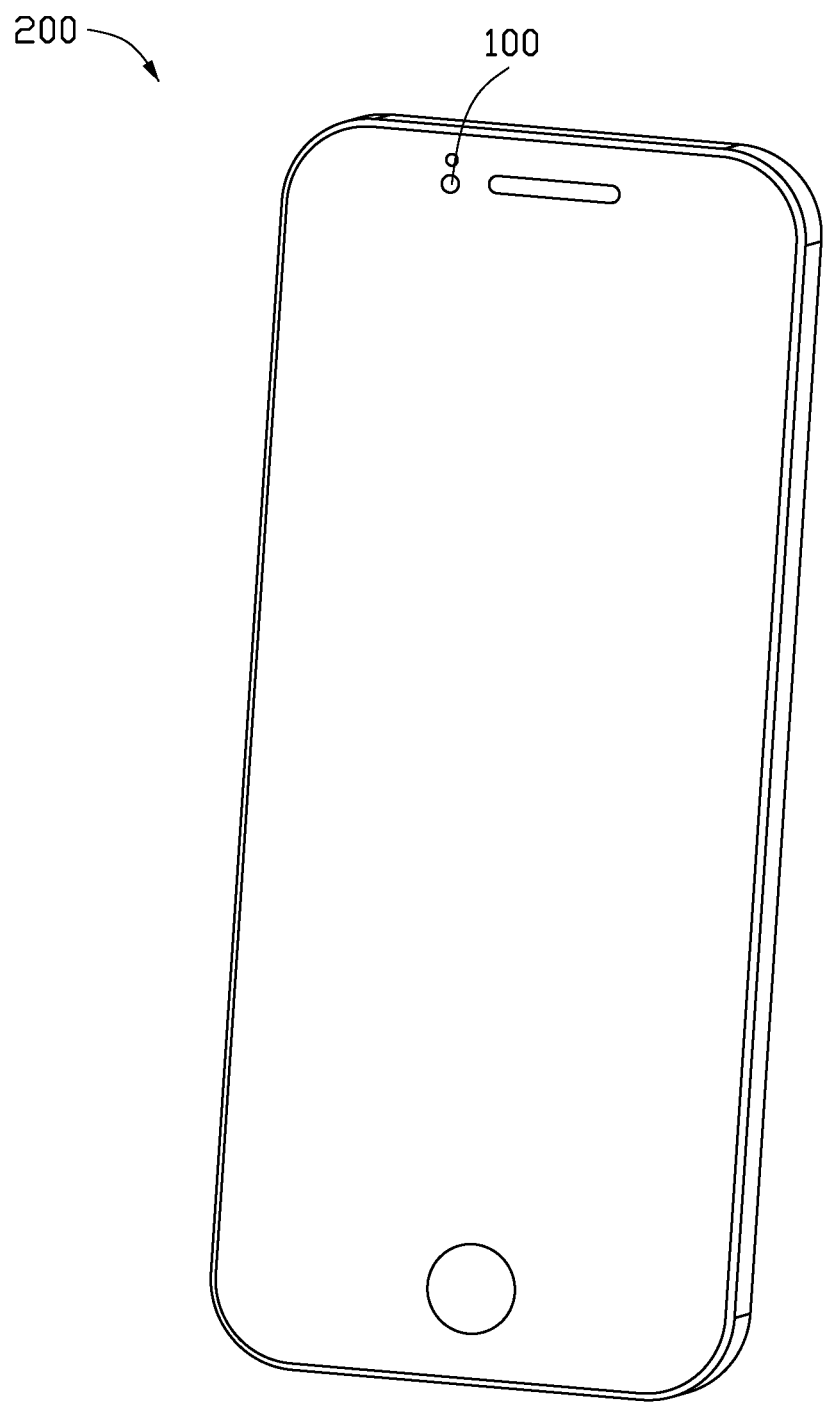
FIG. 5 is diagram of an embodiment of an electronic device having the lens module of FIG. 1.

Referring to FIG. 5, the lens module 100 can be applied in an electronic device 200. The electronic device 200 can be a mobile phone, a laptop, a wearable device, a camera, a monitoring device, or the like.

Since the metal support 40 may improve a strength of the lens holder 30, a thickness of the lens holder 30 may be reduced, thereby reducing a height of the lens module 100 and miniaturizing the lens module 100. The metal support 40 is performed by a black oxide process, thereby preventing light from reflecting on the metal support 40. A stray light of the lens module 100 may be improved, and an imaging quality of the lens module 100 may be improved. The filter 50 sandwiched between the support portion 406 and the stepped surface 320 may prevent the filter 50 from breaking when the lens module 100 falls, thereby enhancing a reliability of the lens module 100. In addition, since the heat dissipation plates 402 are outside the lens holder 30, the heat generated by the lens module 100 can be transmitted to the heat dissipation plates 402 and radiated to the external environment by the heat dissipation plates 402, thereby enhancing a heat dissipation capability of the lens module 100 and the imaging quality of the lens module 100.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A lens module comprising:
   a lens holder comprising a groove and sidewalls surrounding to form the groove;
   a filter; and
   a metal support comprising a support plate, heat dissipation plates, and heat transfer plates connecting between the support plate and the heat dissipation plates;
   wherein at least one first mounting hole is formed on the sidewalls, the support plate comprises a support portion and a connecting portion connected to each other, the connecting portion connects the support portion and each of the heat transfer plates, an opening is formed on the support portion and passes through the support portion, the filter is located on the support portion and covers the opening, the heat transfer plates are installed in the at least one first mounting hole, the support plate and the filter are received in the groove, the heat dissipation plates are located outside the lens holder.

2. The lens module of claim 1, wherein the support portion and the connecting portion cooperate to form a receiving space, the filter is received in the receiving space.

3. The lens module of claim 2, wherein the connecting portion is perpendicular to the support portion.

4. The lens module of claim 2, wherein a receiving hole is formed on the lens holder and passes through the lens holder, the receiving hole communicates with the groove, a width of the receiving hole is less than a width of the groove, thereby forming a stepped surface between the groove and the receiving hole, the filter is sandwiched between the support portion and the stepped surface.

5. The lens module of claim 1, wherein the metal support further comprises at least one positioning member extending from the connecting portion, the lens holder further comprises at least one second mounting hole on the sidewalls, the at least one positioning member is received in the at least one second mounting hole.

6. The lens module of claim 1, wherein each of the heat dissipation plates comprises a base and a plurality of heat dissipation fins on a surface of the base, a surface of the base facing away from the plurality of heat dissipation fins connects one of the heat transfer plates.

7. The lens module of claim 6, wherein the base is perpendicular to the heat transfer plates.

8. The lens module of claim 1, wherein the metal support is darkened by an oxidation treatment.

9. The lens module of claim 1, wherein the lens module further comprises a lens mounted on the lens holder, the lens comprises a first lens portion, a second lens portion, a third lens portion, a fourth lens portion, and a fifth lens portion stacked orderly, a width of the third lens portion is greater than a width of the second lens portion and a width of the fourth lens portion, a width of the fifth lens portion is greater than the width of the fourth lens portion, a width of the first lens portion is greater than the width of the second lens portion.

10. An electronic device comprising:
a lens module comprising:
  a lens holder comprising a groove and sidewalls surrounding to form the groove;
  a filter;
  a metal support comprising a support plate, heat dissipation plates, and heat transfer plates connecting between the support plate and the heat dissipation plates;
  wherein at least one first mounting hole is formed on the sidewalls, the support plate comprises a support portion and a connecting portion connected to each other, the connecting portion connects the support portion and each of the heat transfer plates, an opening is formed on the support portion and passes through the support portion, the filter is located on the support portion and covers the opening, the heat transfer plates are installed in the at least one first mounting hole, the support plate and the filter are received in the groove, the heat dissipation plates are located outside the lens holder.

11. The electronic device of claim 10, wherein the support portion and the connecting portion cooperate to form a receiving space, the filter is received in the receiving space.

12. The electronic device of claim 11, wherein the connecting portion is perpendicular to the support portion.

13. The electronic device of claim 11, wherein a receiving hole is formed on the lens holder and passes through the lens holder, the receiving hole communicates with the groove, a width of the receiving hole is less than a width of the groove, thereby forming a stepped surface between the groove and the receiving hole, the filter is sandwiched between the support portion and the stepped surface.

14. The electronic device of claim 10, wherein the metal support further comprises at least one positioning member extending from the connecting portion, the lens holder further comprises at least one second mounting hole on the sidewalls, the at least one positioning member is received in the at least one second mounting hole.

15. The electronic device of claim 10, wherein each of the heat dissipation plates comprises a base and a plurality of heat dissipation fins on a surface of the base, a surface of the base facing away from the plurality of heat dissipation fins connects one of the heat transfer plates.

16. The electronic device of claim 15, wherein the base is perpendicular to the heat transfer plates.

17. The electronic device of claim 10, wherein the metal support is darkened by an oxidation treatment.

18. The electronic device of claim 10, wherein the lens module further comprises a lens mounted on the lens holder, the lens comprises a first lens portion, a second lens portion, a third lens portion, a fourth lens portion, and a fifth lens portion stacked orderly, a width of the third lens portion is greater than a width of the second lens portion and a width of the fourth lens portion, a width of the fifth lens portion is greater than the width of the fourth lens portion, a width of the first lens portion is greater than the width of the second lens portion.

* * * * *